United States Patent
Haller

[11] Patent Number: 5,715,780
[45] Date of Patent: Feb. 10, 1998

[54] CAM PHASER POSITION DETECTION

[75] Inventor: James Michael Haller, Rochester, N.Y.

[73] Assignee: General Motors Corporation, Detroit, Mich.

[21] Appl. No.: 734,325

[22] Filed: Oct. 21, 1996

[51] Int. Cl.$^6$ .............................. F01L 1/34; G01M 15/00
[52] U.S. Cl. ...................... 123/90.17; 123/414; 73/117.3
[58] Field of Search ...................... 123/90.15, 90.17, 123/90.31, 414; 73/117.3

[56] References Cited

U.S. PATENT DOCUMENTS

| | | | |
|---|---|---|---|
| 4,158,305 | 6/1979 | Shipley | 73/117.3 |
| 4,417,469 | 11/1983 | Stevenson et al. | 73/117.3 |
| 4,517,934 | 5/1985 | Papez | 123/90.17 |
| 4,762,097 | 8/1988 | Baker | 123/90.17 |
| 4,856,465 | 8/1989 | Denz et al. | 123/90.17 |
| 5,522,352 | 6/1996 | Adachi et al. | 123/90.17 |

Primary Examiner—Weilun Lo
Attorney, Agent, or Firm—Michael J. Bridges

[57] ABSTRACT

Internal combustion engine camshaft phaser position detection with a single position sensor fixed in position relative to a rotatably driven member rotating in constant phase with the engine camshaft and a rotatably driving member rotating in constant phase with the engine crankshaft. Teeth or slots are provided on the driven and driving members and pass in proximity to the sensor for varying a sensor output signal which is processed to determine the relative time of passage of the driving and driven members to determine relative phase therebetween.

13 Claims, 4 Drawing Sheets

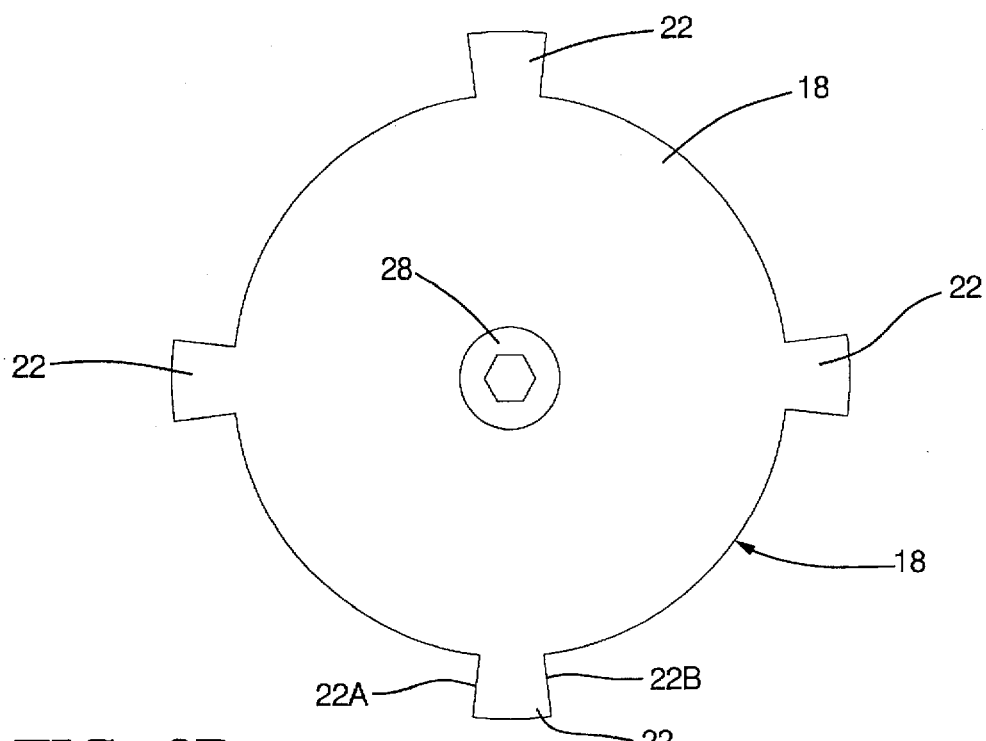
FIG. 3B
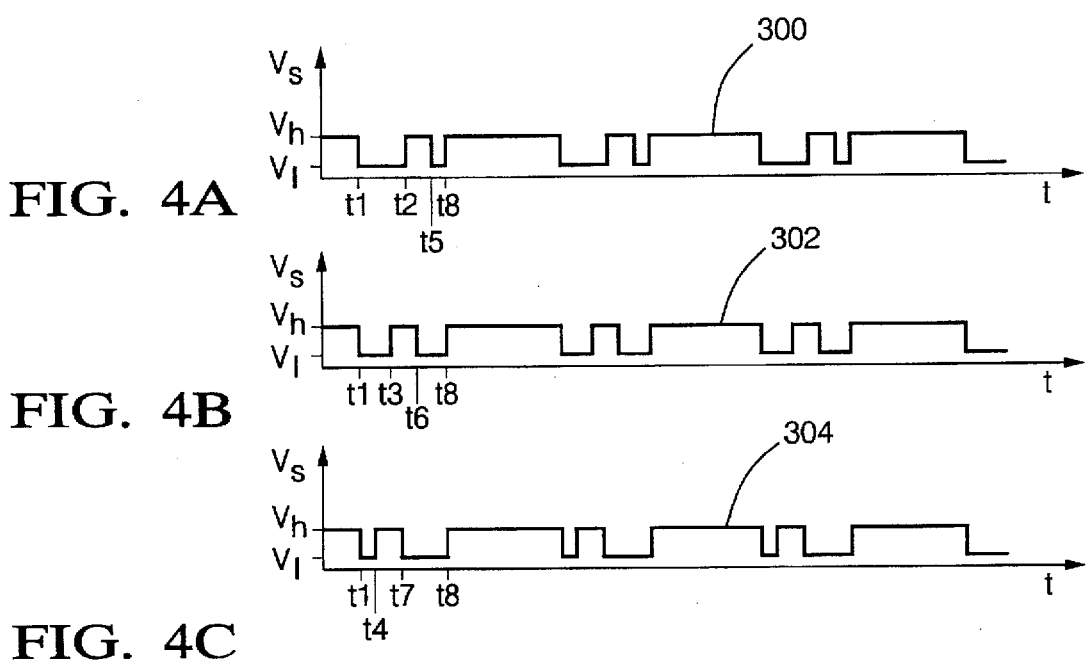
FIG. 4A
FIG. 4B
FIG. 4C

CAM PHASER POSITION DETECTION

FIELD OF THE INVENTION

This invention relates to automotive internal combustion engine camshaft phasing and, more particularly, to camshaft phaser position detection.

BACKGROUND OF THE INVENTION

It is well established in the art relating to engine valve timing control to provide means for varying valve timing to affect engine performance and efficiency. Among the known means for varying valve timing are camshaft phasing devices (phasers) often in the form of drive pulleys incorporating phase changing means for varying the phase angle between a rotatably driving input member, such as a gear, pulley or sprocket and a rotatably driven output member mechanically linked to individual cylinder valves, such as a camshaft. Precision valve timing control requires close control of phase angle between the driven and the driving members. Closed-loop valve timing control has been proposed responsive to a feedback signal indicating actual phase angle, for example using classical control techniques to controllably drive actual phase angle toward a desired phase angle. The precision of such control is limited by the precision of the feedback signal. Phase angle feedback signals are known to be generated through paired position sensors, one measuring motion of the driving member, such as a camshaft pulley and the other measuring motion of the driven member, such as an end of the camshaft adjacent the pulley. The position sensors may take the form of variable reluctance sensors, Hall effect sensors, magnetoresistive sensors or optical sensors which output signals indicating rotational position of the driving and the driven members. The time between certain occurrences of the two output signals is generated to indicate relative phase angle therebetween.

Such prior phase angle position sensing approaches are expensive, complex, have resolution limitations and can be inaccurate. Variation in sensor temperature can lead to sensor output signal drift, which may vary from sensor to sensor, reducing position sensing accuracy. Attempts to overcome problems associated with sensor drift include matching sensors or directly compensating for drift through additional circuitry. Such solutions add to system complexity and cost. Prior sensing systems may require measurement of engine speed in order to determine time between certain occurrences of the two sensor output signals. The relatively low resolution of engine speed sensing in many conventional engines then limits the resolution of the phase angle sensing. Accordingly, closed-loop phase angle control resolution will be low, which may reduce valve timing control performance.

It would therefore be desirable to provide for accurate phase angle sensing with high resolution at low cost and with reduced complexity over conventional sensing approaches. The sensing should be substantially insensitive to sensor temperature variation.

SUMMARY OF THE INVENTION

The present invention is directed to phase angle position sensing between two rotating members, such as between a rotatably driving input member and a rotatably driven output member.

More specifically, a single sensor is provided for phase angle measuring and is positioned in proximity to the two rotatable members wherein a first of the two members includes a plurality of spaced teeth or slots about its circumference and the second of the two members includes a plurality of spaced teeth or slots about its circumference. The two rotating members are positioned in sufficient proximity to the sensor to provide that passage of the teeth or slots by the sensor is transduced into measurable sensor output signal variations indicating relative angular position (phase angle) between the two rotating members.

In accord with a further aspect of this invention, one rotating member includes at least one slot and the other rotating member includes at least one tooth corresponding to and positioned over the slot. Each slot or tooth is defined by edges. Passage of edges of either the slots or teeth by the sensor are transduced into a rising or falling edge of the sensor output signal. Edge detection circuitry monitors the sensor output signal and preferably stores relative time information describing the relative time (time delay) between signal edges. The ratio of the delay between successive neighboring tooth and slot edges indicates absolute phasing between the two rotating members independent of engine speed, removing dependence on engine speed detection accuracy and resolution, thereby increasing sensor resolution and robustness.

In yet a further aspect of this invention, the angular cross-section of each slot is sufficient that the corresponding tooth normally cannot be driven outside the angular cross section of its corresponding slot, simplifying sensor output signal decryption, as the sensor output signal is then constrained to a single consistent edge pattern of two signal edges from passage of slot edges by the sensor, followed by two signal edges from passage of tooth edges by the sensor.

In accord with yet a further aspect of this invention, four slots of about thirty-six degrees angular cross-section are provided in a camshaft phaser in proximity to the portion of the phaser interfacing with an automotive internal combustion engine camshaft. The slots are equi-angularly spaced about the phaser, or about ninety degrees apart. Four corresponding tabs or teeth extend outward from the camshaft circumference at an end of the camshaft that interfaces with the phaser. The tabs have, in one embodiment, an angular cross-section of about twelve degrees and are equi-angularly spaced about the camshaft providing about seventy-eight degrees between each tab. Each of the four tabs is radially aligned with a corresponding one of the four slots and is centered over the slot in the predetermined zero phase angle position between the phaser and the camshaft, providing about twelve degrees slot cross section between each slot edge and a neighboring tab edge. The impact of sensor output signal drift with sensor temperature is minimized as a ratio of a single sensor output signal is monitored. Cost and system complexity are significantly reduced over prior approaches.

BRIEF DESCRIPTION OF THE DRAWINGS

The invention may be best understood by reference to the preferred embodiment and to the drawings in which:

FIGS. 3A and 3B are schematic front view of the arrangement of phaser teeth and slots for sensing phase angle of the phaser of FIG. 1;

FIGS. 4A–4C are signal timing diagrams illustrating the signal timing variation for varying phase angles of the phaser of FIG. 1 for the embodiment of this invention including the tooth and notch arrangement of FIGS. 3A and 3B;

DESCRIPTION OF THE PREFERRED EMBODIMENT

Figure 1:
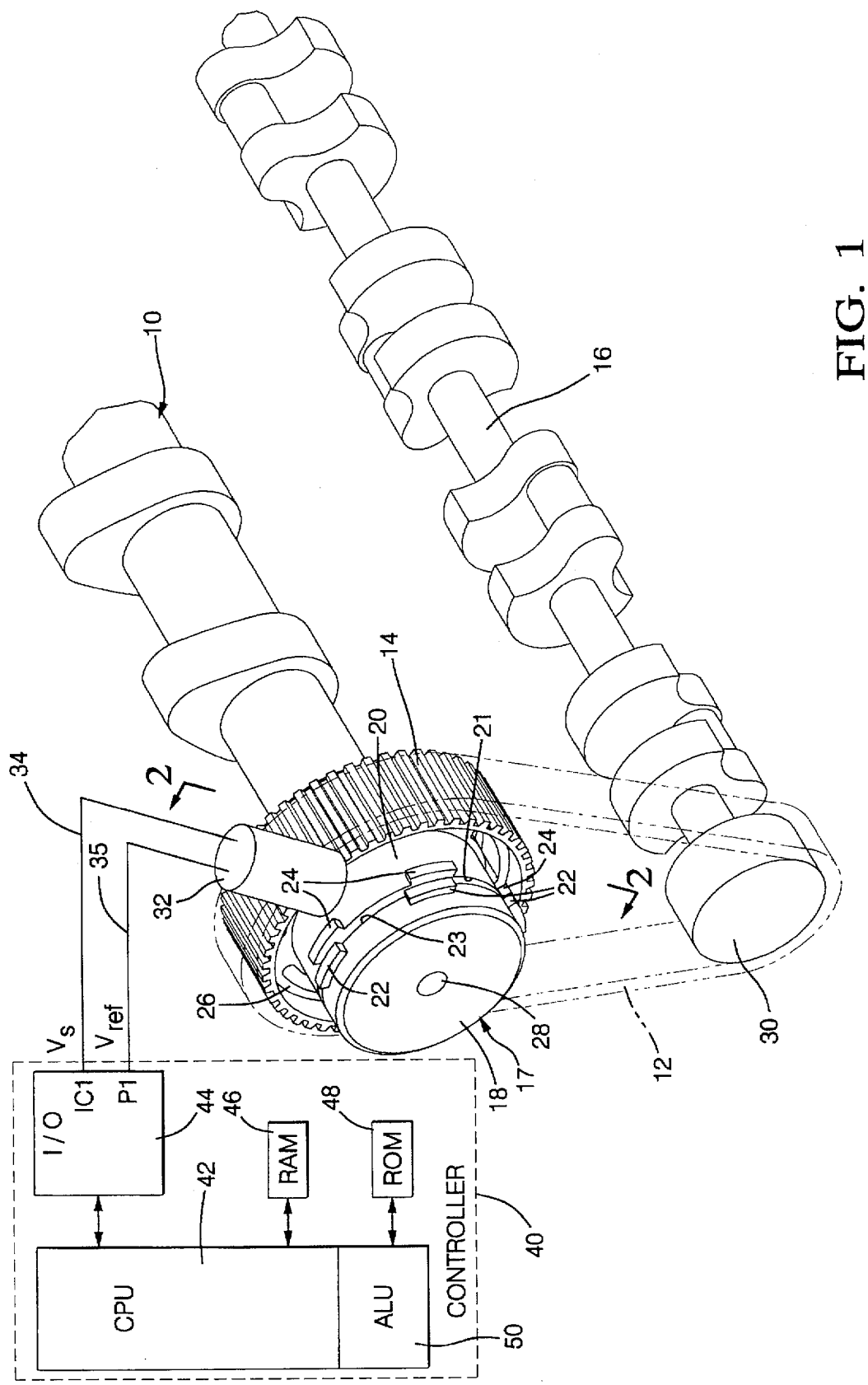
FIG. 1 is an orthogonal phaser diagram with schematic view of electronic control hardware in accord with the preferred embodiment.

Referring to FIG. 1, a portion of the valve gear of an internal combustion engine (not shown) is shown, including crankshaft having a pulley 30, which further may take the form of a chain sprocket, gear, or other suitable conventional drive device, which is adapted to drive a toothed timing belt 12. Camshaft phaser 17 takes the form, in this embodiment, of a helical spline phaser including an outer drive member in the form of a pulley 14 which may likewise take the form of a chain sprocket or gear, adapted to be driven by the timing belt 12. The pulley 14 is fixedly connected by a web 26 to phaser body 20 having a plurality of spaced position markers 24 in the form of teeth about the circumference thereof at phaser body edge 21. In this embodiment, four substantially equally spaced teeth are disposed about the phaser body 20, each extending through about fifty-four degrees, thereby forming notches, which may also serve as position markers, of about thirty-six degrees between each tooth 24, as better illustrated in FIG. 3A. Each notch 25 (FIG. 3A) is defined by edges 25a and 25b. Other notch arrangements may be provided by varying the number of notches and their width. For example, each tooth of the four tooth phaser body 20 may extend through about twelve degrees providing for slots between the substantially equally spaced teeth of about seventy-eight degrees of width.

Phaser cover 18 is secured to conventional automotive camshaft 10 via bolt 28 to rotate in constant phase therewith and includes a plurality of spaced position markers 22 which take the form of teeth positioned in close proximity to an edge 23 of the phaser cover. The edge 23 faces the phaser body edge 21 so that the teeth 22 maintain close proximity to teeth 24 of the phaser body. In this embodiment, the teeth or notches 22 take the form of four teeth extending outward from the cover 18 having an angular cross-section of about twelve degrees with about seventy-eight degrees of angular cross-section between the teeth, as better illustrated in FIG. 3B. Each tooth 22 is defined by tooth edges 22a and 22b.

The teeth 22 and notches 25 are provided for measuring phase angle between the camshaft 10 and the crankshaft 16, wherein the angular offset of the teeth 22, which rotate in phase with the camshaft 10 at all times, relative to the notches 25, which rotate in phase with the crankshaft 16 at all times, indicates the actual phase angle therebetween. In one embodiment of this invention, the teeth 22 are centered over the notches (also called slots) 25 in a position of zero degrees phase advance between the crankshaft 16 and the camshaft 10, providing for about twelve degrees notch overlap on each side of each tooth. As the camshaft phaser is controlled to vary the angular offset between the camshaft 10 and crankshaft 16, for example to vary engine dilution as is generally understood in the art, the position of each tooth 22 over its corresponding notch 25 varies. A position sensor of the commercially available Hall effect, variable reluctance or magnetoresistive type 32 is fixedly positioned relative to the camshaft 10 and phaser 17, for example by mounting the sensor 32 in an engine cylinder head with the sensor center axis centered over the teeth 22 and notches 25 to transduce passage of the teeth 22 and notches 25 into predictable variations in a transducer output signal Vs provided on output signal line 34. More specifically, passage of edges 22a and 22b of the teeth 22 and edges 25a and 25b of the notches (also called slots herein) 25 by sensor 32 cause measurable electromagnetic field disturbances to which sensor 32 is exposed, resulting in predictable variations in sensor output signal Vs on line 34. Vs will generally be at a "high" signal level relative to a reference voltage level Vref on signal line 35 whenever a tooth passes thereunder from the set of teeth 22 or the set 24 of FIG. 1, and otherwise will be at a "low" signal level, as illustrated in the general timing diagrams of FIGS. 4A–4C. Accordingly, Vs is "high," such as at voltage level Vh while any tooth 24 passes thereunder and then drops to a "low" level, such as voltage level Vl at time t1 when an edge, such as edge 24a (FIG. 3A) for a clockwise rotating camshaft 10 (FIG. 1), of any of the teeth of phaser body 20 passes thereunder. The signal Vs remains low until edge 22a, such as 22a (FIG. 3B) for a clockwise rotating camshaft 10 (FIG. 3B), of any tooth 22 of phaser body 18 passes thereunder, such as at time t2 of FIG. 4A, at which time Vs rises back to the high level, Vh. Vs remains at the high level Vh until the tooth 22 passes by the sensor 32 and a high-to-low edge of the sensor, such as edge 22b (FIG. 3B) for a clockwise rotating camshaft 10 (FIG. 1) passes by the sensor 32, such as at time t5 of the signals of FIG. 4A, at which time Vs returns to the low voltage level Vl. The tooth 22 that rotates in phase with the camshaft having passed by the sensor 32, the signal Vs remains at the low level Vl until the notch 25 completes its passage by the sensor 32, such as at the time edge 25b (FIG. 3A) for a clockwise rotating camshaft 10 passes by the sensor 32, for example at time t8 of FIG. 4A.

The phase φ between the camshaft 10 and the crankshaft 16 is then determined simply as the following ratio:

$$\phi = (t8 - t5)/(t2 - t1)$$

wherein the times t1, t2, t5, and t8 are determined by a controller 40 (FIG. 1).

The controller 40 takes the form of a conventional single chip microcontroller having such conventional elements as a central processing unit CPU 42 with an arithmetic logic unit ALU 50, read only memory devices ROM 48, random access memory devices RAM 46, and an input/output unit I/O 44 having input capture input ports one being illustrated as IC1 and having an analog output port P1 for outputting reference voltage signal Vref. The signal Vref is provided to sensor 32 as a sensor reference voltage, and sensor output signal Vs is provided as input to port IC1. Generally, the input capture port IC1 is configured to store the time of occurrence of any transition from a low to a high or from a high to a low voltage level in a corresponding dedicated RAM register. The stored time may be the value of a free running counter maintained by controller 40 (FIG. 1) at the time of the Vs transition. Further, the controller is configured to generate an interrupt at the time of any such transition for temporarily suspending controller operations so that a series of interrupt service operations may be executed on an instruction by instruction basis, as will be described. The interrupt service operations are set up to carry out the general function of reading the counter value stored in the input capture register and store it in a more permanent RAM location and, following receipt of the transition at time t8 (FIGS. 4A–4C), carry out a calculation of φ to determine actual phase angle for use in closed-loop phaser control and diagnostics, as will be described.

Figure 3A:
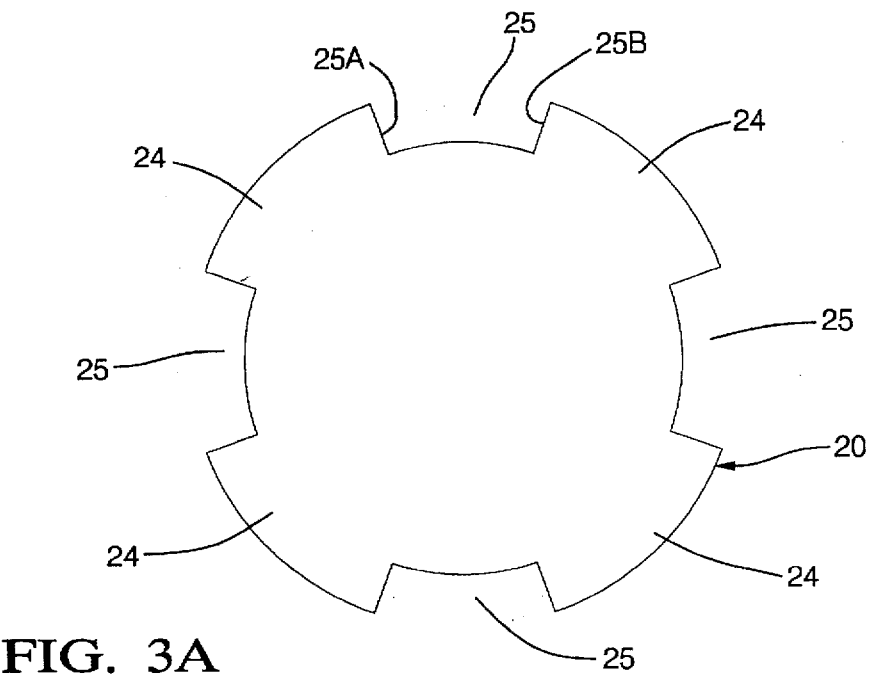

The ratiometric calculation of φ reduces sensitivity to engine speed variation and the use of a single sensor 32 (FIG. 1) provides for a sensing approach insensitive to sensor-to-sensor variation. More specifically, the difference between time t1 and time t8 (FIGS. 3A–3C) is a function of the rate of rotation of the camshaft 10 (FIG. 1) which is driven by the crankshaft 16 (FIG. 1) and is not sensitive to the phase angle between the crankshaft and the camshaft. As illustrated in FIGS. 3A–3C, the signal edges between time t1 and t8 are sensitive to the phase angle between the camshaft 10 and the crankshaft 16. For example, signal pattern 300 of FIG. 3A represents the pattern of edges for signal Vs for a fully retarded phase angle between the camshaft 10 and crankshaft 16, pattern 302 of FIG. 3B for zero phase angle between the camshaft 10 and crankshaft 16 and pattern 304 of FIG. 3C for a fully advanced phase angle between the camshaft 10 and the crankshaft 16. The signal patterns of FIGS. 3A–3C are taken under constant engine speed conditions, corresponding to constant camshaft rate of rotation conditions. Accordingly, signals 300, 302, and 304 have times t1 and t8 in common. The timing of the signal pulse between times t1 and t8 varies for signals 300, 302, and 304 due to variation in relative phase between the camshaft 10 and crankshaft, as described. For signal 300, the signal pulse is defined by edges at times t2 and t5. For signal 302, the signal pulse is defined by edges at times t3 and t6, and for signal 304, the signal pulse is defined by edges at times t4 and t7. For increasing camshaft phase lag, the time between t1 and the signal pulse increases up to a time difference t2–t1 (FIG. 3A) corresponding to a maximum phase lag. Likewise, as the camshaft lag decreases, the time between t1 and the signal pulse decreases up to a time difference t4–t1 (FIG. 3C) corresponding to a minimum phase lag.

The signal information of FIGS. 3A–3C is repeatedly transmitted to the controller 40 (FIG. 1) while the engine is running providing up-to-date phase information, with resolution limited by the frequency of the controller free-running clock and by the rate of rotation of the camshaft. Accurate, timely information is therefore made available for closed-loop phaser control at all times during an engine operating cycle.

Figure 2:
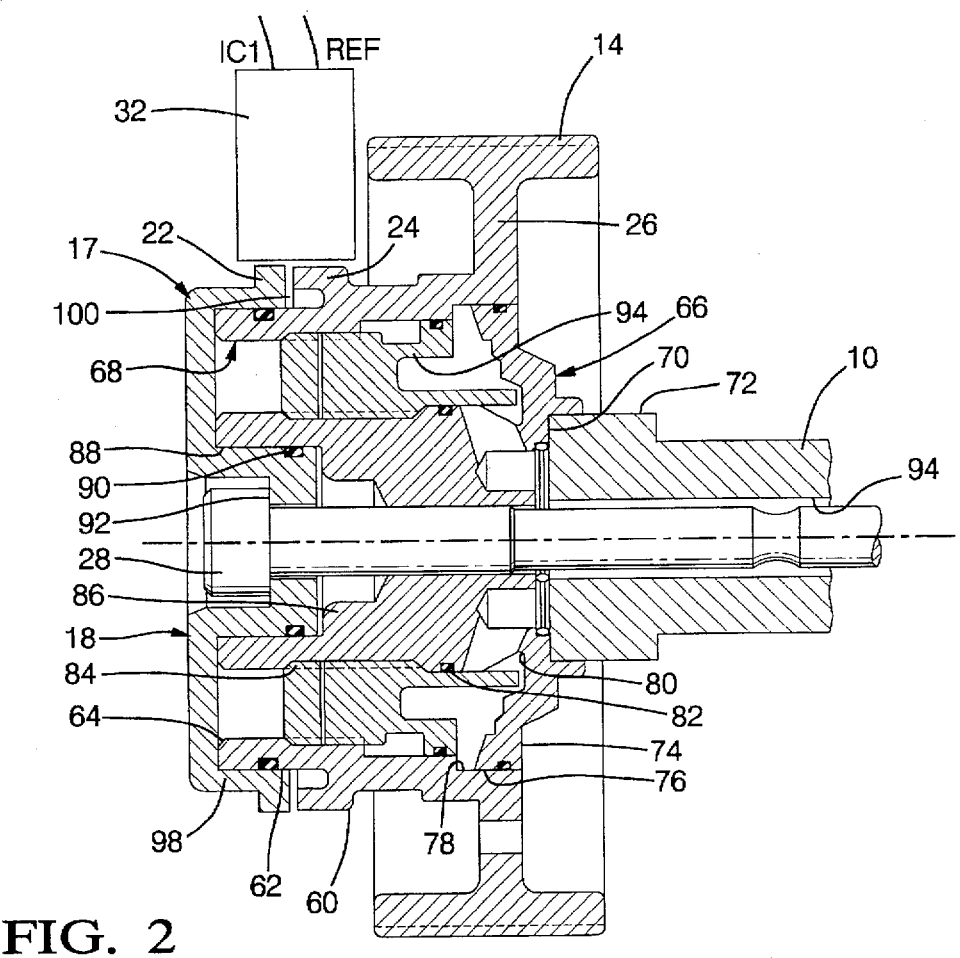
FIG. 2 is a side cutaway view of the phaser of FIG. 1 taken along reference 2—2.

Referring to FIG. 2, a side cutaway view of the phaser 17 of FIG. 1 taken along reference 2—2 details the location of teeth 22 and 24 relative to sensor 32. The cam phaser 17 includes pulley 14 adapted to be driven by toothed timing belt 12 (FIG. 1). The pulley is connected by web 26 with a tubular portion 60 extending axially to one side of the web and having at an outer end a cylindrical bearing surface 62. Within the portion 60 and extending from the outer end adjacent bearing surface 62 are internal right hand helical splines 64. Pulley 14 is supported for relative rotation upon a coaxial driven hub assembly comprising an assembly of a hub flange 66 and a hub 68. The hub flange includes an end having a circular recess 70 in which the end of a camshaft journal 72 is received. A flange 74 extends outwardly from the recess 70 and terminates outwardly in an enlarged cylindrical journal 76 that slideably engages an internal bearing journal 78 of the hub 60. Adjacent to the flange 74 an opening away from the camshaft 10, the hub flange 66 includes a recess 80 adjacent an external guiding surface 82 containing a piston seal ring (not shown).

Hub 68 comprises a tubular body provided, on an outer diameter, with external left hand helical splines 84. On its inner diameter, hub 68 includes a raised portion 86 and further outward, in the direction away from the camshaft 10, the hub 68 inner diameter forms a slightly enlarged internal locating surface 88 having a retaining ring groove 90 toward its inner end. Phaser cover 18 has a central opening and a generally U-shaped annular cross-section and is mounted on the outer ends of the hub 68 and tubular portion 60. An inward extension of the cover 18 forms a shoulder 92 against which is clamped the head of a central fastener in the form of an attaching bolt 28. The bolt 28 extends through openings in the cover 18 into a hollow center 94 of the camshaft 10 wherein it is threadably engaged in a manner not shown. Cover 18 encloses an annular space within the cam phaser 17 in which are located a first annular hydraulic phase control piston 94 and a second annular hydraulic lash control piston 96. Further structural detail of the pistons 94 and 96 is provided in copending U.S. patent application Ser. No. 08/353,776, assigned to the assignee of this application.

Extending outwardly from an outer wall 98 of cover 18 are the plurality of spaced teeth 22 such as of the dimension described in FIG. 3B. Extending outwardly from the tubular portion 60 in proximity to the interface between the tubular portion 60 and the bearing surface 62 are the plurality of spaced teeth 24 which take, in this embodiment, the dimension described in FIG. 3A. The teeth extend in an "L" shape from the tubular portion 60 toward the teeth 22 to increase the flat tooth surface area facing the sensor 32 and to provide an air gap 100 of minimum length between the path of rotation of the teeth 22 and the teeth 24. Sensor 32 is centered over air gap 100 to be exposed to both sets of teeth 22 and 24, with the sensing terminal of the sensor 32 of sufficient cross-section to be sensitive to electromagnetic field disruptions from both sets of teeth 22 and 24. The sensor 32 may be mounted in fixed position relative to the rotating cover 18, which rotates in constant phase with the camshaft 10 and relative to the rotating tubular portion 60 which rotates in constant phase with the crankshaft 16 (FIG. 1). The sensor 32 may be mounted in any suitable mounting location providing for close sensor proximity to the sets of teeth 22 and 24, such as on an engine cylinder head or valve cover (not shown).

Figure 5:
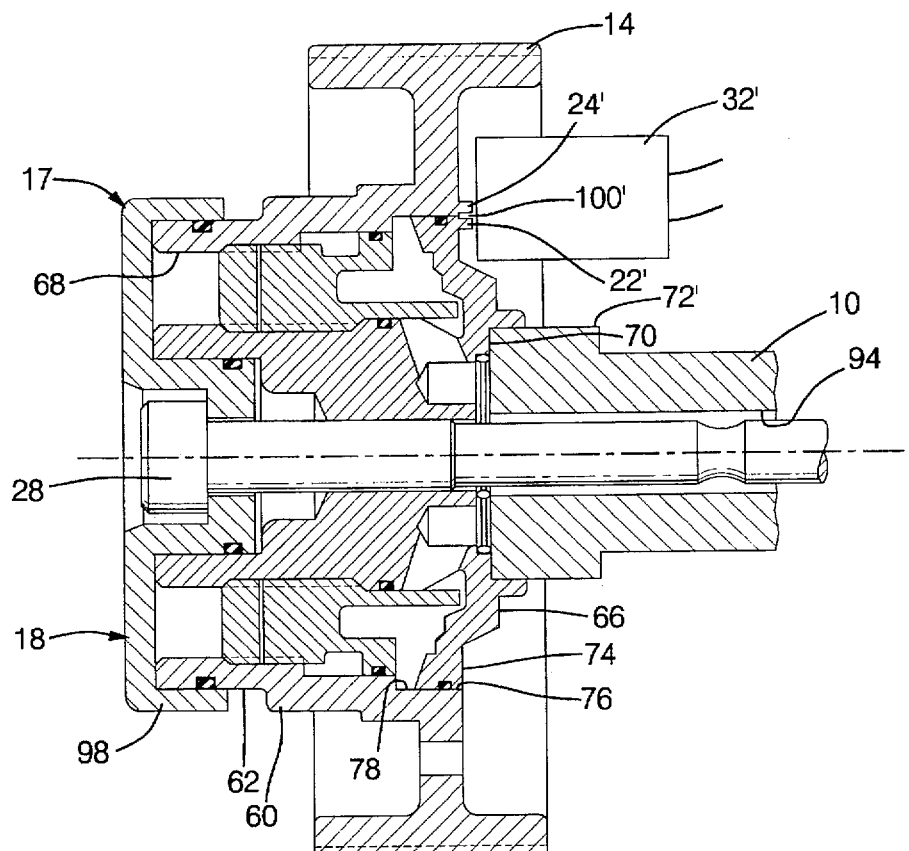
FIG. 5 is a side cutaway diagram of an alternative phaser configuration in accord with an alternative embodiment of this invention.

Referring to FIG. 5, a side cutaway view of the general helical spline arrangement of FIG. 1, taken along reference 2—2 details an alternative mounting location for the teeth 22' and 24' and the sensor 32' of this invention. Details not specifically referenced or referred to in FIG. 5 are as described in FIG. 2 and in the incorporated reference. Bolt 28 passes through central opening in phaser cover 18 and is threadably engaged through a central bore 94 in camshaft 10. The cam phaser 17 includes pulley 14 adapted to be driven by toothed timing belt 12 (FIG. 1). The pulley 14 is connected by web 26 with a tubular portion 60 extending axially to one side of the web 26 and having at an outer end a cylindrical bearing surface 62 engaging outer surface 98 of cover 18. Pulley 14 is supported for relative rotation upon a coaxial driven hub assembly comprising an assembly of a hub flange 66 and a hub 68. The hub flange 66 includes an end having a circular recess 70 in which the end of the camshaft journal 72 is received. A flange 74 extends outwardly from the recess 70 and terminates outwardly in an enlarged cylindrical journal 76 that slideably engages an internal bearing journal 78 of the hub 60. Plurality of spaced "L shaped" teeth 22' of the dimension generally described in FIG. 3B extend outward in an "L shape" from the flange 74 away from web 26 and curve outward in a direction away from the camshaft 10. Plurality of spaced teeth 24' extend outwardly from the hub 60 away from the web 26 in a direction away from the cover 18. Teeth 22' are positioned in close proximity to cylindrical journal 76 and teeth 24' are positioned in close proximity to journal 78 and a separated by air gap 100' of minimum width to ensure sensing portion of sensor 32' faces a substantial surface area of teeth 22' and 24'. Sensor 32 may be mounted in any suitable location, such as on engine block (not shown).

Figure 6:
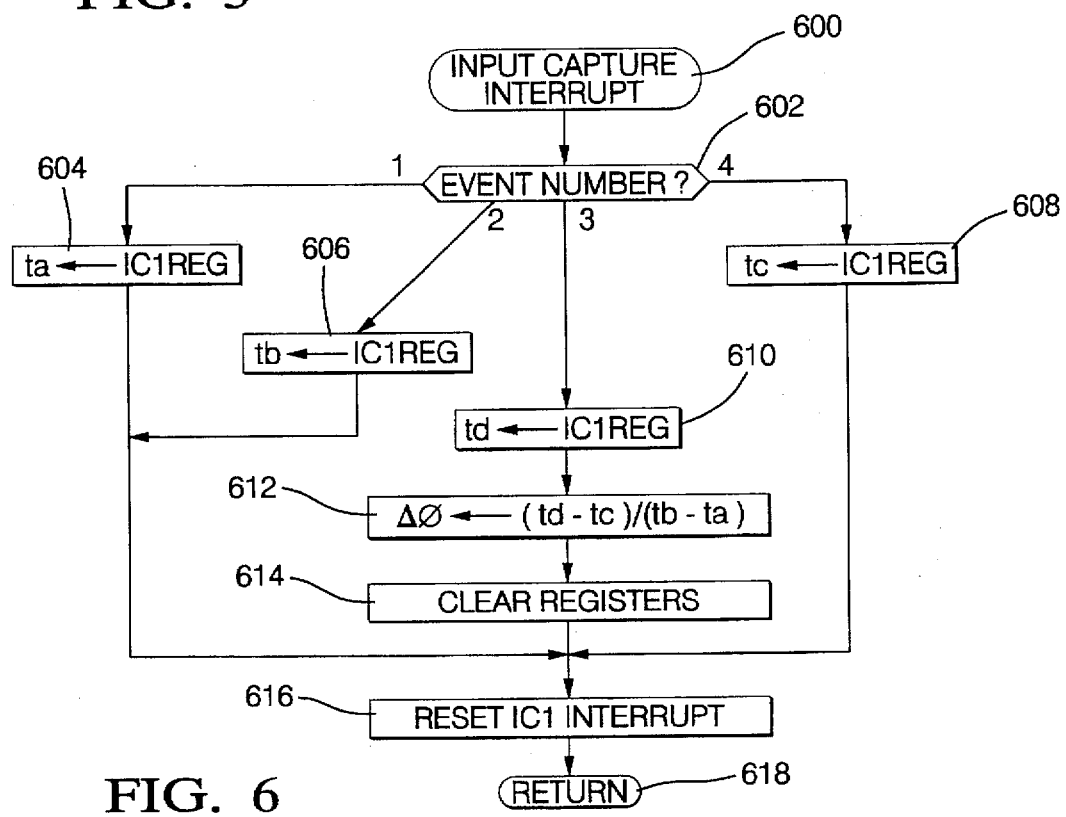
FIG. 6 is a general flow diagram illustrating a flow of operations for generating a signal indicating relative phase of the phaser of FIG. 1 using the tooth and notch arrangement of FIGS. 3A and 3B.

Referring to FIG. 6, an outline of the series of operations for referencing and interpreting Vs signal pulses is detailed. The operations begin at a step 600 upon receipt of an input capture interrupt which, as described, may be set up through conventional controller initialization operations to occur on either a falling or a rising edge of signal Vs as received in the input capture port IC1 of the I/O device 40 of FIG. 1. Following the step 600, a determination is made at a next step 602 of which edge event has occurred. For each rotation of the camshaft 10 of FIG. 1, four signal events in the form of Vs signal transitions (also referred to as signal edges) occur. The first occurs at a time ta corresponding to passage of the first edge of teeth 24, such as edge 25a of the teeth 24 of FIG. 3A, by sensor 32 (FIG. 1). The second occurs at a time tb corresponding to passage of the first edge of a tooth 22, such as edge 22a of FIG. 3B, by sensor 32. The third occurs at a time tc corresponding to passage of the second edge of the tooth 22, such as edge 22b of FIG. 3B, by sensor 32. The fourth occurs at a time td corresponding to passage of the second edge of the tooth 24, such as edge 24b of FIG. 3A, by sensor 32.

The specific edge event that has triggered the current input capture interrupt may be distinguished at the step 602 in a variety of ways. For example, a counter may be maintained in a RAM device 46 (FIG. 1) that is initialized to one upon a first received edge at the start of an engine operating cycle and is incremented for each detected Vs signal transition and repeats after reaching a value of four to provide a pointer that indicates which edge has been received. Still further, the time difference between the received signals indicates, when interpreted in the context of a measured current engine speed value, which of the four events has occurred. Still further, the direction of the Vs transition, for example from a low to a high voltage, can be used to help identify which of the four transitions has occurred.

If it is determined that the "first edge" has occurred, the routine proceeds from step 602 to store a value from a register IC1REG into RAM location labeled ta at a next step 604. The value stored in IC1REG is the value of a controller free running counter automatically transferred to the register IC1REG at the time a transition in signal Vs was detected at port IC1, as described. Alternatively, if it is determined at the step 602 that the "second edge" has occurred, the routine proceeds from step 602 to store the IC1REG value into RAM location labeled tb at a step 606. Alternatively, if it is determined at the step 602 that the "third edge" has occurred, the routine proceeds from step 602 to stored the IC1REG value into RAM location labeled tc at a step 608. Finally, if it is determined that the "fourth edge" has occurred, the routine proceeds from step 602 to stored the IC1REG value into RAM location labeled td at a step 610. After the step 610, a phase difference value $\Delta\phi$ is determined at a next step 612 representing the difference in phase between the camshaft 10 and the crankshaft 16 (FIG. 1) as follows:

$$\Delta\phi = (td-tc)/(tb-ta)$$

as described. The phase difference value may be stored in RAM 46 (FIG. 1) for use in any conventional closed-loop phaser position control procedure, for example, a conventional control procedure that controllably drives phaser position, as determined at the step 612 toward a desired phaser position. The desired phaser position may be established as a function of current operating conditions and a desired engine cylinder intake air charge dilution, providing well-established emissions reduction benefits.

Additionally, the phase difference value $\Delta\phi$ may be filtered by applying it to a lag filter process including prior measured $\Delta\phi$ values to arrive at a phase difference measurement with reduced noise and disturbance sensitivity. The filtered phase difference measurement may then be applied in a closed-loop phaser position control procedure.

After determining and storing the phase difference value $\Delta\phi$ at the step 612, the registers ta, tb, tc, and td are cleared to prepare for new measured time values at a step 614 and next, or following the described steps 604, 606, and 608, the input capture 1 interrupt is reset at a step 616 to recur at the time of the next transition of the signal Vs at input port IC1 (FIG. 1). The routine then concludes by returning, at a next step 618 to any prior controller operations that may have been suspended to allow for servicing of the high priority IC1 interrupt.

In an alternative embodiment within the scope of this invention, the cross-section of the teeth and notches may vary considerably away from that described in FIGS. 3A and 3B. For example, the teeth 24 extending from the phaser body 20 may have substantially reduced cross-section approaching that of the teeth 22 of the phaser cover 18 and even decreasing to a smaller cross-section than that of the teeth 22 of the phaser cover 18. In such alternative embodiment, passage of the edges defining such teeth 24, corresponding to edges 25a and 25b of FIG. 3A, must be detected and distinguished from passage of the edges 22A and 22B of the phaser cover 18 through adjustments to the input capture interrupt service routine of FIG. 6. The phase relationship between the teeth 24 and the teeth 22 in such alternative embodiment must be set to allow clear distinction of which tooth edge triggers each input capture interrupt to allow robust phase detection in accord with this invention, as can be provided through application of ordinary skill in the art.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. A phase detection apparatus for detecting a difference in phase angle between a first and a second rotating member, comprising:

a pair of edges disposed on the first rotating member;

a pair of edges disposed on the second rotating member;

a sensor in fixed position relative to the first and second rotating members for transducing the time of passage of the pair of edges disposed on the first rotating member and for transducing the time of passage of the pair of edges disposed on the second rotating member into variations of a sensor output signal; and circuitry for receiving the output signal and for detecting, from the sensor output signal variations, the difference in phase angle between the first and second rotating members as a predetermined function of the transduced time of passage of the pair of edges disposed on the first rotating member and of the transduced time of passage of the pair of edges disposed on the second rotating member.

2. The mechanism of claim 1, wherein the first rotating member is an internal combustion engine camshaft phaser which rotates in phase with an engine crankshaft and which is controlled to vary said phase angle and wherein the second rotating member is a camshaft phaser cover that rotates in phase with an engine camshaft.

3. The mechanism of claim 1, wherein the pair of edges disposed on the first rotating member define a tooth therebetween extending outward from the first rotating member, and wherein the pair of edges disposed on the second rotating member define a slot therebetween.

4. The mechanism of claim 3, wherein the slot extends over a predetermined arc length and wherein the tooth has a predetermined width less than the predetermined arc length, and wherein the tooth is positioned over the slot such that the time of passage of the pair of edges defining the tooth occurs between the time of passage of the pair of edges defining the slot.

5. The mechanism of claim 4, wherein the circuitry further comprises:
   arithmetic logic circuitry for determining a first time difference between the time of passage of a first of the pair of edges defining the slot and the time of passage of a first of the pair of edges defining the tooth;
   arithmetic logic circuitry for determining a second time difference between the time of passage of a second of the pair of edges defining the slot and the time of passage of a second of the pair of edges defining the tooth; and
   arithmetic logic circuitry for generating a ratio of the second time difference to the first time difference to indicate the difference in phase angle between the first and second rotating members.

6. A phaser position detector for detecting a difference in phase angle between a crankshaft and a camshaft of an internal combustion engine, comprising:
   a first rotating member rotating in substantial constant phase with the crankshaft and having a position marker disposed thereon having first and second sides;
   a second rotating member rotating in substantial constant phase with the camshaft and having a position marker disposed thereon having first and second sides, the position marker of the second rotating member positioned to rotate in proximity to the position marker of the first rotating member;
   a sensor in a fixed location relative to the first and second rotating members in position to transduce passage of the position markers of the first and second rotating members into sensor output signal transitions; and
   circuitry for receiving the sensor output signal and for determining relative timing between sensor output signal transitions and for detecting the difference in phase angle as a function of the determined relative timing.

7. The phaser position detector of claim 6, wherein the first rotating member is a camshaft phaser and the second rotating member is a camshaft phaser cover.

8. The phaser position detector of claim 6, wherein the position marker of the first rotating member is a tooth extending outward from the first rotating member and having a tooth cross-section between the first and second sides.

9. The phaser position detector of claim 8, wherein the position marker of the second rotating member is a notch having a notch cross-section between the first and second sides, the notch cross-section exceeding the tooth cross-section.

10. The phaser position detector of claim 6, wherein the position marker of the second rotating member is a tooth extending outward from the second rotating member and having a tooth cross-section between the first and second sides.

11. The phaser position detector of claim 10, wherein the position marker of the first rotating member is a notch having a notch cross-section between the first and second sides, the notch cross-section exceeding the tooth cross-section.

12. The phaser position detector of claim 11, wherein the tooth is maintained over the notch so that the first and second sides of the tooth pass the sensor between the passage of the first and second sides of the notch.

13. The phaser position detector of claim 12, wherein the circuitry further comprises:
   arithmetic logic circuitry for generating a first timing difference between the time of occurrence of the signal transition corresponding to the second side of the notch and the time of occurrence of the signal transition corresponding to the second side of the tooth, and for generating a second timing difference between the time of occurrence of the signal transition corresponding to the first side of the tooth and the time of occurrence of the signal transition corresponding to the first side of the notch, and for generating a ratio of the first timing to the second timing, the ratio indicating the difference in phase angle between the first and second rotating members.

* * * * *